United States Patent [19]
Katayama

[11] Patent No.: US 6,327,227 B1
[45] Date of Patent: Dec. 4, 2001

(54) MAGNETIC RECORDER/REPRODUCTION APPARATUS INCLUDING A SELECTIVE TEMPERATURE CONTROLLER AND MAGNETIC RECORDING REPRODUCTION METHOD INCLUDING SELECTIVE TEMPERATURE CONTROL

(75) Inventor: Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/485,381

(22) PCT Filed: Jul. 24, 1998

(86) PCT No.: PCT/JP98/03367

§ 371 Date: Feb. 8, 2000

§ 102(e) Date: Feb. 8, 2000

(87) PCT Pub. No.: WO99/08262

PCT Pub. Date: Feb. 18, 1999

(30) Foreign Application Priority Data

Aug. 8, 1997 (JP) .................................................. 9-214623

(51) Int. Cl.[7] .................................................. G11B 11/00
(52) U.S. Cl. .................................................................. 369/13
(58) Field of Search ............................... 369/13, 14, 110, 369/116; 300/114, 59

(56) References Cited

U.S. PATENT DOCUMENTS 5,202,863 * 4/1993 Miyatake et al. .......................... 369/13
5,568,336 * 10/1996 Jolivet ........................................ 369/13

FOREIGN PATENT DOCUMENTS

57164415 * 10/1982 (JP) .
4325950 * 11/1992 (JP) .
562399 * 3/1993 (JP) .

OTHER PUBLICATIONS h. Muraoka et al., *IEEE Transactions on Magnetics*, 30(6):3900–3902 (1994).

* cited by examiner

*Primary Examiner*—Tan Dinh
(74) *Attorney, Agent, or Firm*—Dike Bronstein, Roberts & IP Group; David G. Conlin; David A. Tucker

(57) ABSTRACT

A magnetic recording-reproduction apparatus in accordance with the present invention, which carries out recording and reproducing processes on and from a magnetic recording-reproducing medium on which a perpendicular magnetic recording layer made of a ferrimagnetic material whose magnetic compensation temperature is set to approximately room temperature is formed, is arranged so that the length direction of the main magnetic pole of the head is made coincident with the information track direction. The magnetic recording-reproduction apparatus is also provided with a recording-reproducing magnetic head constituted by at least two single magnetic pole heads that are aligned side by side, and a means for raising the temperature of one portion of the magnetic recording-reproducing medium facing the main magnetic pole of each single magnetic pole head. With this arrangement, it becomes possible to avoid crosstalk over a plurality of tracks, and since it is possible to eliminate the need for a magnetic head having recording and reproducing single magnetic pole heads in a hybrid manner, the head manufacturing process can be simplified.

23 Claims, 3 Drawing Sheets

MAGNETIC RECORDER/REPRODUCTION APPARATUS INCLUDING A SELECTIVE TEMPERATURE CONTROLLER AND MAGNETIC RECORDING REPRODUCTION METHOD INCLUDING SELECTIVE TEMPERATURE CONTROL

FIELD OF THE INVENTION

The present invention relates to a magnetic recording-reproduction apparatus and a magnetic recording-reproduction method that are preferably used in a perpendicular magnetic recording system of an optical assist type, etc. and that are capable of performing high-density recording in a magnetic disk device and a magnetic tape device.

BACKGROUND OF THE INVENTION

Tremendous research efforts have been directed to a perpendicular magnetic recording system for a long time as a system which can carry out recording with higher density as compared with a system that carries out magnetic recording in the longitudinal direction (in the in-plane direction) (longitudinal magnetic recording system). In order to achieve a next-generation magnetic recording technique that enables a recording density exceeding 10 $Gb/in^2$, various studies and developing efforts have been directed to designs and machining processes for heads and media having constructions that unitize features of the perpendicular magnetic recording system. In particular, with respect to magnetic heads used for perpendicular magnetic recording/reproducing processes, studies have been directed to a single magnetic pole head which has an optimal construction.

Along with the recent developments in the technique for achieving higher density in the longitudinal magnetic recording system, a method in which the thickness of the main magnetic pole of the single magnetic pole head is made equal to the track width has been proposed and this method has attracted public attention as a recording system which well utilizes the high-density recording characteristic of the perpendicular magnetic recording (for example, see IEEE Transactions On Magnetics, vol. 30, No. 6, November, 1994, pp3900–3902).

In this method, information is written by using a plurality of recording single magnetic pole heads that are aligned in a direction parallel to the track direction of a magnetic medium, and information is read out by using a plurality of reproducing single magnetic pole heads that are aligned in a direction perpendicular to the track direction. This method makes it possible to carry out a deep sub-micron track recording with a track width of not more than 0.5 µm.

Moreover, also in a tracking servo system and a high-speed accessing system for such high-density tracks, a track following technique with higher precision which exceeds the conventional servo performances is required. For this reason, in a separate manner from the above-mentioned recording single magnetic pole head, a reproducing single magnetic pole head is installed and its main magnetic pole is aligned so as to make the length direction perpendicular to the tracks; thus, the head is designed so as to have a wider width in the track traversing direction so that a multi-track reproducing is carried out. Here, the tracking is performed based upon the above-mentioned reproducing single magnetic pole head so as to meet the high-speed reproducing process and track following process.

However, in the above-mentioned conventional apparatus, the reproducing process is carried out by using one single magnetic pole head in a manner so as to extend over a plurality of tracks; consequently, pieces of information on a plurality of tracks are simultaneously reproduced, with the result that crosstalk tends to occur. For this reason, an advanced multivalued signal processing circuit, etc., which is completely different from that of the conventional magnetic recording signal process, is required in a separate manner. The resulting problem is that an extremely complex magnetic recording-reproduction apparatus is required.

Moreover, in the conventional apparatus having a reproducing single magnetic pole head in a separate manner from the recording single magnetic pole head, a magnetic head, which has two heads, that is, a recording single magnetic pole head and a recording single magnetic pole head, in a hybrid manner, has to be installed. The resulting problem is that a complicated head manufacturing process is required.

DISCLOSURE OF THE INVENTION

In order to solve the above-mentioned problems, a magnetic recording-reproduction apparatus in accordance with the present invention, which carries out recording and reproducing processes on and from a magnetic recording-reproducing medium on which a perpendicular magnetic recording layer made of a ferrimagnetic material whose magnetic compensation temperature is set to approximately room temperature is formed, is provided with: a recording-reproducing magnetic head constituted by a plurality of single magnetic pole magnetic heads having respective main magnetic poles whose length directions are aligned in the same direction as the information track direction of the magnetic recording-reproducing medium, the recording-reproducing magnetic head being used for both recording and reproducing; and a temperature-raising means for allowing an area facing the main magnetic poles of the respective single magnetic pole heads in the perpendicular magnetization layer to have a temperature rise.

In the above-mentioned arrangement, the recording-reproducing magnetic head is constituted by not less than two of the single magnetic pole magnetic heads which have respective main magnetic poles whose length directions are aligned in the same direction as the information track direction of the magnetic recording-reproducing medium, and which are used for both recording and reproducing. This makes it possible to increase the tracking density. The magnetic recording-reproducing medium used in the above-mentioned magnetic recording-reproduction apparatus is provided with the perpendicular magnetic recording layer made from a ferrimagnetic material having a magnetic compensation temperature set to approximately room temperature; therefore, an area (portion) of the recording layer that is virtually at room temperature exhibits a smaller saturated magnetization, thereby minimizing the leakage magnetic flux therefrom.

The following description will discuss a process in which information is recorded and reproduced on and from the above-mentioned magnetic recording-reproduction medium by using the recording-reproducing magnetic head. In this case, one portion of an area in the perpendicular magnetic recording layer facing the main magnetic poles of the single magnetic pole heads is subjected to a temperature rise (for example, by irradiation with a light beam or heating by using a minute thermal source), and the recording and reproducing processes are carried out as follows:

When, upon recording, the temperature of a recording area is raised to the vicinity of the Curie temperature so that the coercive force of the perpendicular magnetic recording layer becomes nearly zero, the leakage magnetic field from the single magnetic pole heads is applied to the recording area so that the information is readily recorded thereon. In other words, a high track density is achieved by a recording process using the narrow track that nearly corresponds to the width of each main magnetic pole of the single magnetic pole heads.

In contrast, when, upon reproducing, the temperature of a reproducing area is raised so as to allow the saturated magnetization of the ferrimagnetic material to reach the vicinity of the maximum value, a non-temperature-rise area, that is, an area that faces the main magnetic poles of the single magnetic pole heads and is maintained in the vicinity of the magnetic compensation temperature (virtually, room temperature); therefore, a magnetic flux released from the saturated magnetization only from the temperature-rise area (reproducing area) is detected by the single magnetic pole heads facing the area with high precision. This makes it possible to positively solve the conventional problem that information separation is not properly made due to the operation carried out in a manner extending over a plurality of recording bits in the track direction, and consequently to reproduce information recorded with high linear density that is an original feature of the perpendicular magnetic recording system.

Moreover, it is not necessary to install separated sets of single magnetic pole heads respectively used for recording and reproducing, and this eliminates the need for a special signal processing such as a multi-value processing that is required for a multi-track batch reproducing process in the case of a single reproducing head. Furthermore, in the case when an optical beam is used to raise the temperatures of the recording area and the reproducing area, a high-precision tracking operation is available by using the optical beam applied thereto.

Here, the gap between the single magnetic pole heads can be widened by orienting the alignment direction of the single magnetic pole heads with an angle with respect to the direction of the information tracks; thus, it is possible to reduce magnetic interferences from the adjacent single magnetic pole heads, and consequently to provide information recording and reproducing processes with a further improved S/N ratio.

Moreover, the application of an arrangement in which an elliptical area elongated in the aligning direction of the single magnetic pole heads is used as the temperature-rise area makes it possible to raise the temperature of an area of the perpendicular magnetization recording layer facing the single magnetic pole heads at one time, and consequently to simplify the temperature-raising means as well as to suppress the expansion of the temperature distribution of the temperature-rise area in the track direction. Thus, a bit recording process, which is virtually determined by the shape of the main magnetic pole of the single magnetic pole head, can be carried out with higher linear density.

Furthermore, it becomes possible to make the magnetic recording-reproduction apparatus thinner by arranging the recording-reproducing magnetic head and the temperature raising means on the same side as the perpendicular magnetic recording layer.

For a fuller understanding of the nature and advantages of the invention, reference should be made to the ensuing detailed description taken in conjunction with the accompanying drawings.

BEST MODE FOR CARRYING OUT THE INVENTION

Referring to Figures, the following description will discuss the best mode for carrying out the invention.

Figure 1A:
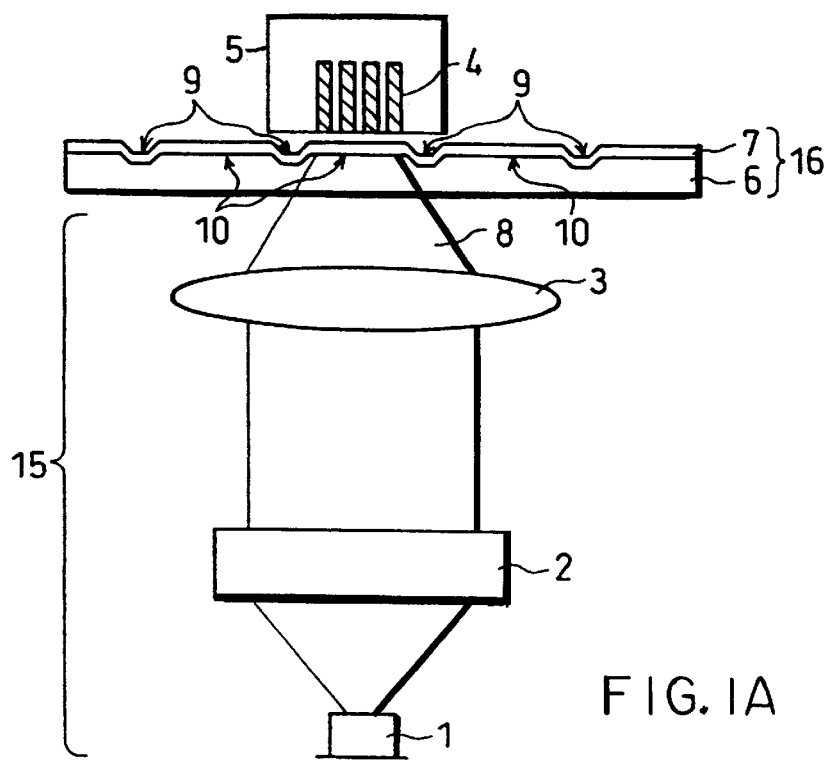
FIG. 1(a) is a schematic drawing showing a magnetic recording/reproduction apparatus in accordance with Embodiment 1 of the present invention wherein the magnetic head and the temperature raising means face each other on opposite sides of the magnetic recording/reproducing medium.

FIG. 1(a) is a schematic drawing that shows the entire construction of a magnetic recording-reproduction apparatus in accordance with Embodiment 1 of the present invention.

Figure 1B:
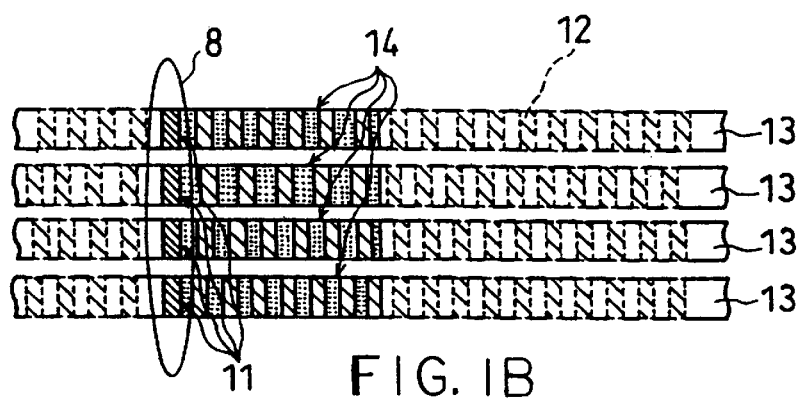
FIG. 1(b) is a schematic front view of a representative magnetic recording-reproducing medium used in Embodiment 1 of the present invention.

Moreover, FIG. 1(b) is a front view that shows a magnetic recording-reproducing medium used in the present invention.

As illustrated in FIG. 1(a), the magnetic recording-reproduction apparatus of the present invention is provided with a light beam irradiation system 15 (temperature-raising means) mainly constituted by a laser light source 1 which is constituted by a semiconductor laser and which, upon recording as well as reproducing, generates (releases) a light beam so as to raise the temperature of a desired area on a magnetic recording-reproducing layer 7, a cylindrical lens 2 and an objective lens 3. The present magnetic recording-reproduction apparatus is further provided with a recording-reproducing magnetic head 5 made by multi-arranging at least two (four in the present embodiment) single magnetic pole heads 4 with the same intervals, that have main magnetic poles whose length directions (perpendicular direction in the Figure) are aligned in the track direction, and a magnetic disk 16 (magnetic recording-reproducing medium) made of a disk substrate 6 and a perpendicular magnetic recording layer 7.

The above-mentioned recording-reproducing magnetic head 5 has a plurality of single magnetic pole heads 4 that are aligned with the same intervals, and each single magnetic pole head 4 has both functions as a recording magnetic head and as a reproducing magnetic head so that even only the recording-reproducing head 5 can carry out recording and reproducing processes when a recording area and a reproducing area are allowed to have temperature rises.

In the above-mentioned magnetic disk 16, guiding grooves 9 and lands 10 are formed on its surface in the shape of concentric circles or in a spiral form.

As illustrated in FIG. 1(b), in the light beam irradiation system 15, the cylindrical lens 2 is placed between the laser light beam 1 and the objective lens 3 so as to shape the light beam 8 into an elliptical beam (an elliptical shape). With this arrangement, it is possible to simultaneously irradiate a plurality of information tracks 13 within the elliptical beam with its major axis being coincident with the alignment direction of the single magnetic pole heads 4 that are arranged laterally with respect to the information tracks (arranged in a direction perpendicular to the track direction with predetermined intervals). Here, although not shown in the Figure, an optical system for focusing servo and tracking servo operations may be installed in the optical beam irradiation system 15 on demand.

The magnetic disk 16 is constituted by a perpendicular magnetic recording layer 7 made of a ferrimagnetic material having its magnetic compensation point temperature (hereinafter, referred to as compensation temperature) at virtually room temperature and a disk substrate 6.

With respect to the ferrimagnetic material, taking into consideration the permissible power of the semiconductor laser for the laser light source 1 used for giving a temperature rise at the time of recording or reproducing, it is preferable to set the temperature for allowing the saturated magnetization of the ferrimagnetic material to have a maximum value at the time of reproducing in the range of 120° C. to 240° C., and with respect to the Curie temperature that gives influences to the recording sensitivity, it is preferably to set it in the range of 200° C. to 350° C. Moreover, in order to obtain a sufficient reproducing output from each single magnetic pole head 4 at the time of reproducing, taking into consideration the reproducing sensitivity of the single magnetic pole head 4, it is preferable to select a material having a saturated magnetization of at least 150 emu/cc as the ferrimagnetic material. With respect to materials satisfying the above-mentioned requirements, for example, $Dy_x(Fe_{1-y}Co_y)_{1-x}$ and $Tb_x(Fe_{1-y}Co_y)_{1-x}$, etc. are listed. In these cases, x and y are respectively set so as to satisfy $10<x<40$ and $10<y<50$.

With respect to the disk substrate 6, materials having a light-transmitting property, such as glass, glass ceramics, sapphire, polycarbonate and amorphous polyolefin, are used. Here, in the case of a magnetic recording-reproduction apparatus of the type in which, with respect to the magnetic disk 16, the light beam irradiation system 15 and the recording-reproducing magnetic head 5 are placed on the same side as the perpendicular magnetization recording layer 7 formation side (see FIG. 3), a material having a light-transmitting property is not necessarily required as the disk substrate material; and for example, an Al substrate with an NiP underlayer, opaque ceramics, etc., may be used.

Guide grooves 9 and lands 10 are alternately formed on the surface of the disk substrate 6. In the present embodiment, four information tracks 13 are formed for each land 10. A row of information bits 12 are recorded on each information track 13 through the corresponding single magnetic pole head 4, and information bits 12, recorded through the corresponding single magnetic pole head 4, are read from the information track 13 (see FIG. 1(b)). In this case, since the light beam 8 is allowed to shift together with the recording-reproducing magnetic head 5 along the guide groove 9, the track-following operation is carried out.

Next, referring to FIG. 1(b), an explanation will be given of an information recording process which is carried out by using the magnetic recording apparatus of the present invention. First, a driving electric current, which varies in accordance with recorded information, is allowed to flow from a driving circuit (not shown) through a coil (not shown) that is wound around each single magnetic pole head 4 so that the single magnetic pole head 4 is magnetically excited, while a light beam 8 is directed onto the surface of the recording-reproducing medium 14 so that one portion thereof (a desired recording portion) facing the main pole of the single magnetic pole head 4 is subjected to a temperature rise up to the vicinity of the Curie temperature of the ferrimagnetic material.

Since the above-mentioned perpendicular magnetic recording layer 7 is made of a ferrimagnetic material having its compensation temperature at virtually room temperature, only the portion irradiated with the light beam 8 (temperature rise portion) in the perpendicular magnetic recording layer 7 is heated up to the vicinity of the Curie temperature, and this portion comes to have a smaller coercive force. When a magnetic field generated by the magnetized main pole of the single magnetic pole head 4 is applied to the area having a smaller coercive force, a magnetization reversal occurs only at the corresponding area, with the result that an information bit 11 is recorded as illustrated in FIG. 1(b). At this time, since the magnetic field distribution is limited to approximately the thickness of the main pole of the single magnetic pole head 4, the width of the information track 13 is also limited to not more than 0.5 μm, thereby making it possible to perform a high track-density recording process, that is, a so-called deep sub-micron track recording process.

Moreover, the application of the light beam 8 (see FIG. 1(b)) having an elliptical shape elongated in the aligning direction of the single magnetic pole heads 4 makes it possible to suppress the expansion of the temperature distribution in the information track direction, that is, the expansion of the distribution of the coercive force; therefore, a rectangular-shaped bit recording process, which is virtually determined by the shape of the main magnetic pole of the single magnetic pole head 4, can be carried out with high recording density also in the track direction.

As described in the present embodiment, in an attempt to simplify the apparatus and to uniform the irradiated portion, it is preferably to adopt the irradiated portion by the light beam that is formed into an elliptical shape; however, the present invention is not intended to be limited by this arrangement, and another arrangement may be used in which each information bit 11 to be recorded or reproduced is individually irradiated with light.

Next, also referring to FIG. 1(b), an explanation will be given of an information reproducing process which is carried out by using the magnetic recording apparatus of the present invention.

A light beam 8 is directed to one portion (desired reproducing portion) of the surface of the recording-reproducing medium 14 facing the main pole of the single magnetic pole head 4 so that it is subjected to a temperature rise to the vicinity of a temperature (120° C. to 240° C.) that allows the saturated magnetization of the perpendicular magnetic recording-reproducing medium (perpendicular magnetic recording layer 7) to have a maximum value.

In the perpendicular magnetic recording layer 7, only the magnetization becomes greater at the reproducing area having the temperature rise so that a leakage magnetic flux from the reproducing area (reproducing portion) is detected by the single magnetic pole head 4; thus, it is possible to read the information bit 11 as information.

At this time, in the above-mentioned perpendicular magnetic recording layer 7, an area (non-irradiated portion) that has not been subjected to the irradiation by the light beam 8 does not have a temperature rise, and is maintained at a magnetic compensation temperature that is set to virtually room temperature; therefore, since the saturated magnetization is small and since magnetic flux leakage therefrom is also small, no information is simultaneously read from the non-irradiated portion. In other words, of an area on the information tracks 13 of the magnetic recording-reproducing medium facing the main poles of the single magnetic pole heads 4, only the area (portion) irradiated with the light beam 8 is allowed to reproduce the information bit 11.

For this reason, even if the length direction of the main poles of the single magnetic pole heads 4 is made coincident with the track direction, it is possible to avoid simultaneously reading information bits 11 recorded in the track direction with high density in a bridging manner together with a plurality of bits located before and after, and consequently to reproduce information recorded with high linear density that is an original feature of the perpendicular magnetic recording system. Moreover, in the same manner as the recording process, the track-following operation is carried out with high precision also in the reproducing process by utilizing the light beam 8 having the elliptical shape.

Moreover, even in the case when the single magnetic pole head 4 has a tracking deviation, since the influence appears in the reproduced signal from the single magnetic pole head 4 in the same manner, it is possible to easily compensate for the deviation. As described above, in the magnetic recording-reproduction apparatus of the present invention, both the recording and reproducing processes of information can be carried out by using the same recording-reproducing magnetic head 5 and the optical beam irradiation system 15.

Figure 4:
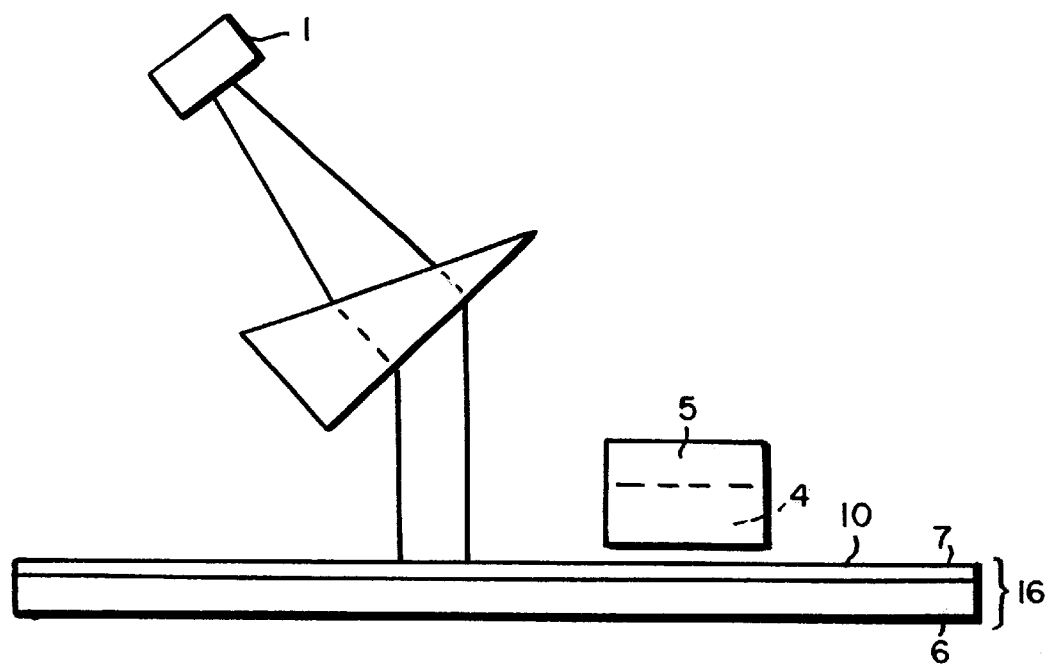
FIG. 4 is a schematic drawing showing a magnetic recording-reproduction apparatus in accordance with yet another embodiment of the present invention similar to that shown in FIG. 3, but wherein a triangular prism is utilized to direct temperature raising input against the recording-reproducing medium.
Figure 5:
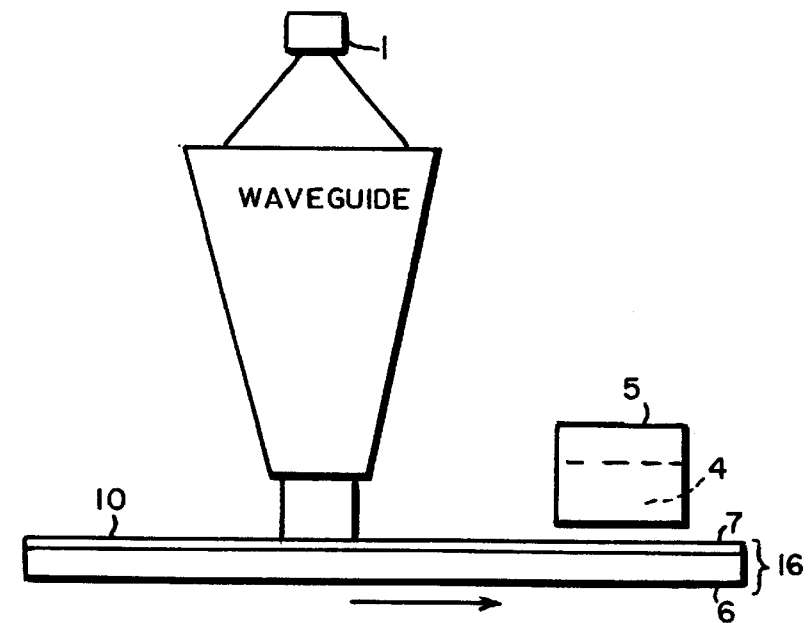
FIG. 5 is a schematic drawing showing a magnetic recording-reproduction apparatus in accordance with yet another embodiment of the present invention similar to that shown in FIG. 3, but wherein a taper shaped waveguide is utilized to direct temperature raising input against the recording-reproducing medium.

In the present embodiment, in order to form the light beam 8 having an elliptical shape, the cylindrical lend 2 is used; however, the present invention is not intended to be limited by this arrangement, and in place of the cylindrical lens 2, for example, another arrangement may be adopted in which a laser beam, released from a semiconductor laser of the laser light source 1 is formed into an elliptical shape with a predetermined ratio of the major and minor axes by utilizing a triangular prism (see, FIG. 4), etc., or in which the shape is changed while being allowed to pass through a waveguide having a taper shape (see, FIG. 5).

Figure 3:
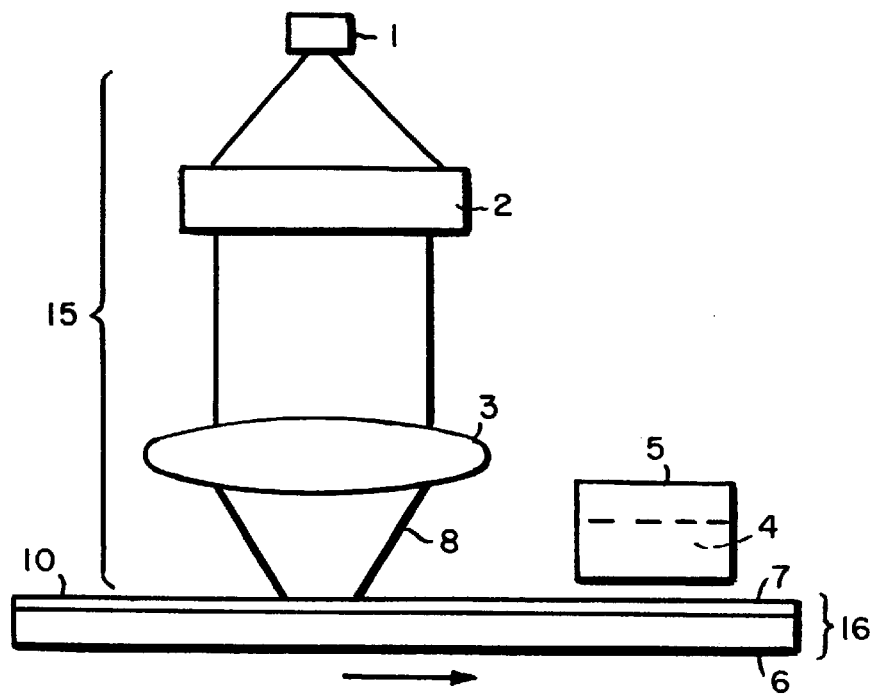
FIG. 3 is a schematic drawing showing a magnetic recording-reproduction apparatus in accordance with another embodiment of the present invention wherein the magnetic head and the temperature raising means are disposed on the same side of the magnetic recording-reproducing medium.

Moreover, in the present embodiment, the explanation has been given of the case in which the recording- reproducing magnetic head 5 and the light beam irradiation system 15 are aligned face to face, with the magnetic disk 16 being interpolated in between; however, the present invention is not intended to be limited to this arrangement, and both of the parts may be placed on the same side as the formation side of the perpendicular magnetic recording layer 7 with respect to the magnetic disk 16 (see, FIG. 3). This arrangement easily makes the apparatus thinner. In this case, Since the perpendicular magnetic recording layer 7 needs to be heated prior to the recording or reproducing process by the recording-reproducing magnetic head 5, the light beam irradiation system 15 is placed on the leading edge side of the main magnetic poles of the single magnetic pole heads 4 in the proximity of the recording-reproducing magnetic head 5 so that an area of the perpendicular magnetic recording layer 7 facing the leading edge is subjected to a temperature rise.

In the present embodiment, the magnetic disk 16 is used as the recording-reproducing medium; however, the present invention is not intended to be limited by this, and other media such as magnetic tapes may be used.

Figure 7:
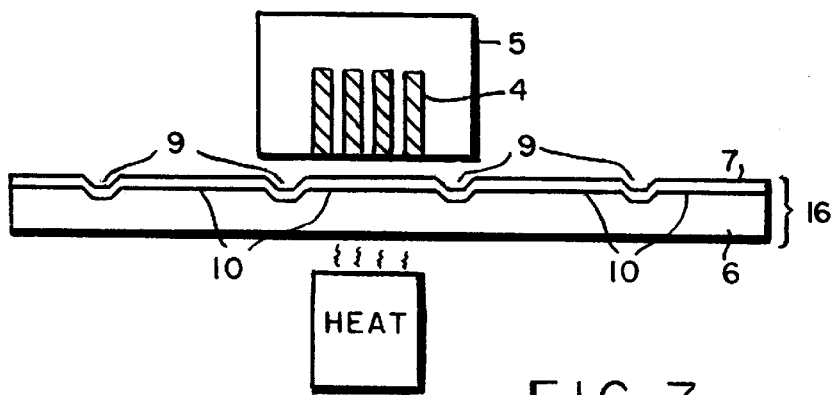

Moreover, in the above-mentioned embodiment, the light beam irradiation system 15 is exemplified as the temperature-raising means; however, the present invention is not intended to be limited by this. With respect to the temperature raising means, a minute heat source system, made of a minute heat generating body placed in the proximity of the recording section and the reproducing section, may be adopted as the temperature raising means (see, for example, FIG. 7). In this case, the heat applying width of the minute heat generating body in the traversing direction of the information tracks is set in a manner so as to bridge a plurality of information tracks. With respect to the minute heat generating body, metal materials, such as tungsten, tantalum, molybdenm, nickel-chromium alloy, iron-chromium-aluminum alloy, having a superior heat generating efficiency, and non-metal materials, such as silicon carbide, boron nitride and ruthenium oxide, may be adopted.

Figure 2:
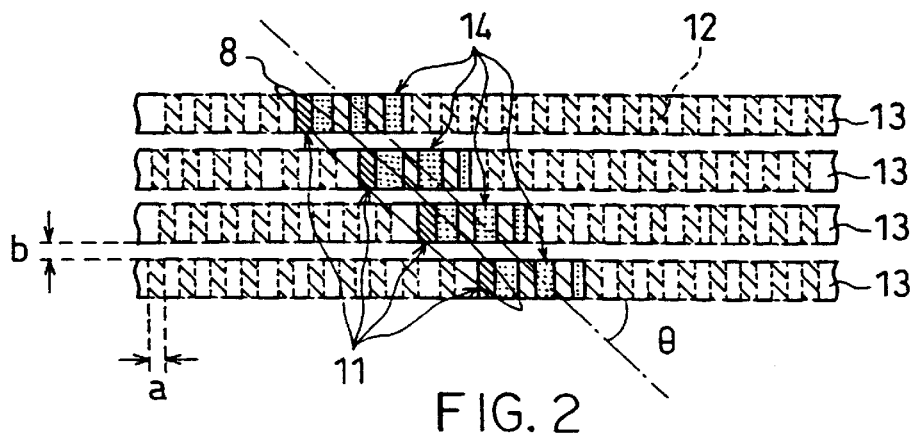
FIG. 2 is a schematic view similar to that of FIG. 1(b) showing a representative magnetic recording-reproducing medium used with Embodiment 2 of the present invention in which the magnetic head and the temperature raising means are set at an acute angle relative to the tracks on the recording-reproducing medium.

Next, with respect to the second embodiment of the present invention, an explanation will be given of a case in which the single magnetic pole heads 4 are placed with an angle with respect to the direction of the information tracks 13 (information track direction). FIG. 2 shows a top view of a magnetic recording-reproducing medium in accordance with the present embodiment (see also FIG. 6). Here, those members that have the same functions as those shown in FIG. 1 are Indicated by the same reference numerals, and the detailed description thereof is omitted.

Figure 6:
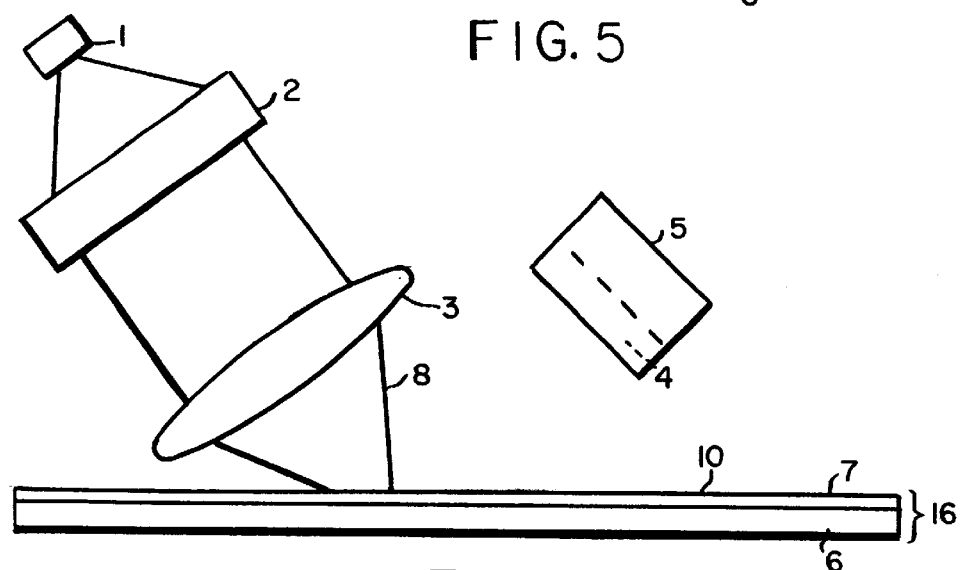
FIG. 6 is a schematic drawing showing a magnetic recording-reproduction apparatus in accordance with yet another embodiment of the present invention similar to that shown in FIG. 3, but wherein the temperature raising means and magnetic head are disposed at substantially equal acute angles to opposite sides of a plane perpendicular to the recording-reproduction medium that meet substantially at the surface of the recording-reproducing medium; and, FIG. 7 is a schematic drawing showing a magnetic recording-reproduction apparatus in accordance with yet another embodiment of the present invention similar to that shown in FIG. 1 indicating that the temperature raising means of this invention may comprise a heat generating means located in close relation to the space between the magnetic head and the magnetic recording-reproducing medium.

The present embodiment is different from the first embodiment in the following points as will be recognized, for example, in conjunction with FIGS. 2 and 6. In the present embodiment, in the recording-reproducing magnetic head 5 the respective single magnetic pole heads 4 are arranged so that, as illustrated in FIG. 2, information bits 11 are diagonally formed with an angle θ with respect to the information tracks 13. In this case also, the single magnetic ole heads 4 are respectively placed with predetermined distances in the direction of the information tracks. In accordance with the arrangement of the respective magnetic pole heads 4, the light beam 8, directed from the laser light source 1 at the time of recording as well as reproducing, is directed onto the perpendicular layer 7 in an elliptical shape having a tilt by the angle θ in the major axis direction with respect to the track direction.

Next, referring to FIG. 2, an explanation will be given of an information recording process which is carried out by using the magnetic recording apparatus of the present embodiment. First, a driving electric current, which varies in accordance with recorded information, is allowed to flow from a driving circuit (not shown) through a coil (not shown) that is wound around each single magnetic pole head 4 so that the single magnetic pole head 4 is magnetically excited, while a light beam 8 is directed in an elliptical shape having a tilt by the angle of θ in the major axis direction with respect to the track direction. As a result, a recording portion on the surface of the recording-reproducing medium 14 facing the main poles of the single magnetic pole heads 4 is subjected to a temperature rise up to the vicinity of the Curie temperature of the ferrimagnetic material.

Since the above-mentioned perpendicular magnetic recording layer 7 is made of a ferrimagnetic material having its compensation temperature at virtually room temperature, only the portion irradiated with the light beam 8 (temperature rise portion) in the perpendicular magnetic recording layer 7 is heated up to the vicinity of the Curie temperature, and this portion comes to have a smaller coercive force. When a magnetic field generated by the magnetized main pole of the single magnetic pole head 4 is applied to the area having a smaller coercive force, a flux reversal occurs only at the corresponding area, with the result that an information bit 11 is recorded diagonally with the angle θ with respect to the information tracks 13 as illustrated in FIG. 2. At this time, since the magnetic field distribution is limited to approximately the thickness of the main pole of the single magnetic pole head 4, the width of the information track 13 is also limited to not more than 0.5 μm, thereby making it possible to perform a high track-density recording process, that is, a so-called deep sub-micron track recording process.

Moreover, the application of the light beam 8 having an elliptical shape elongated in the aligning direction of the single magnetic pole heads 4 makes it possible to suppress the expansion of the temperature distribution in the information track direction, that is, the expansion of the distribution of the coercive force; therefore, a rectangular-shaped bit recording process, which is virtually determined by the shape of the main magnetic pole of the single magnetic pole head 4, can be carried out with high recording density also in the track direction.

As described in the present embodiment, in an attempt to simplify the apparatus and to uniform the irradiated portion, it is preferable to arrange so that the irradiated portion by the light beam is formed into an elliptical shape having a tilt by the angle of θ in the major axis direction with respect to the track direction (see, FIG. 6); however, the present invention is not intended to be limited by this arrangement, and another arrangement may be used in which each information bit 11 to be recorded or reproduced is individually irradiated with light.

Next, also referring to FIG. 2, an explanation will be given of an information reproducing process which is carried out by using the magnetic recording apparatus of the present embodiment.

A light beam 8, formed into an elliptical shape having a tilt by the angle of θ in the major axis direction with respect to the track direction, is directed to a desired reproducing portion (corresponding to an information bit 11 in FIG. 2) of the surface of the recording-reproducing medium 14 facing the main pole of the single magnetic pole head 4 so that it is subjected to a temperature rise to the vicinity of a temperature (120° C. to 240° C.) that allows its saturated magnetization to have a maximum value.

In the perpendicular magnetic recording layer 7, only the magnetization becomes greater at the reproducing area having the temperature rise so that a leakage magnetic flux from the reproducing portion is detected by the single magnetic pole head 4; thus, it is possible to read the information bit 11 as information.

At this time, in the above-mentioned perpendicular magnetic recording layer 7, an area (non-irradiated portion) that has not been subjected to the irradiation by the light beam 8 does not have a temperature rise, and is maintained at a magnetic compensation temperature that is set to virtually room temperature; therefore, since the saturated magnetization is small and since magnetic flux leakage therefrom is also small, no information is simultaneously read from the non-irradiated portion. In other words, of an area on the information tracks 13 of the magnetic recording-reproducing medium facing the main poles of the single magnetic pole heads 4, only the area (portion) irradiated with the light beam 8 is allowed to reproduce the information bit 11.

For this reason, even if the length direction of the main poles of the single magnetic pole heads 4 is made coincident with the track direction, it is possible to avoid simultaneously reading information bits 11 recorded in the track direction with high density in a bridging manner together with a plurality of bits located before and after, and consequently to reproduce information recorded with high linear density that is an original feature of the perpendicular magnetic recording system. Moreover, in the same manner as the recording process, the track-following operation is carried out with high precision also in the reproducing process by utilizing the light beam 8 having the elliptical shape.

Moreover, even in the case when the single magnetic pole head 4 has a tracking deviation, since the influence appears in the reproduced signal from the single magnetic pole head 4 in the same manner, it is possible to easily compensate for the deviation. As described above, in the magnetic recording-reproduction apparatus of the present invention, both the recording and reproducing processes of information can be carried out by using the same recording-reproducing magnetic head 5 and the optical beam irradiation system 15.

In the present embodiment, in order to form the light beam 8 having an elliptical shape, the cylindrical lens 2 is used; however, the present invention is not intended to be limited by this arrangement, and in place of the cylindrical lens 2, for example, another arrangement may be adopted in which the laser beam, released from a semiconductor laser of the laser light source 1 is formed into an elliptical shape with a predetermined ratio of the major and minor axes by using a triangular prism (see FIG. 4), etc., or in which the shape is changed while being allowed to pass through a waveguide having a taper shape (see FIG. 5).

Moreover, in the present embodiment, the explanation has been given of the case in which the recording-reproducing magnetic head 5 and the light beam irradiation system 15 are aligned face to face, with the magnetic disk 16 being interpolated in between; however, the present invention is not intended to be limited to this arrangement, and both parts may be placed on the same side as the formation side of the perpendicular magnetic recording layer 7 with respect to the magnetic disk 16 (see, FIG. 3). This arrangement easily makes the apparatus thinner. In this case, since the perpendicular magnetic recording layer 7 needs To be heated prior to the recording or the reproducing process by the Recording-reproducing magnetic head 5, the light beam irradiation system 15 is placed on the leading edge side of the main magnetic poles of the single magnetic pole heads 4 in the proximity of the recording-reproducing magnetic head 5 so that an area of the perpendicular magnetic recording layer 7 facing the leading edge is subject to a temperature rise.

In the present embodiment, the magnetic disk 16 is used as the magnetic recording-reproducing medium; however, the present invention is not intended to be limited by this, and other media such as magnetic tapes may be used.

Moreover, in the above-mentioned embodiment, the light beam irradiation system 15 is exemplified as the temperature raising means; however, the present invention is not intended to be limited by this. With respect to the temperature-raising means, a minute heat source system, made of a minute heat generating body placed in the proximity of the recording section and the reproducing section, may be adopted (see, FIG. 7). In this case, the heat applying width of the minute heat generating body In the traversing direction of the information tracks is set in a manner so as to bridge a plurality of information tracks. With respect to the minute heat generating body, metal materials, such as tungsten, tantalum, molybdenum, nickel-chromium alloy, iron-chromium-aluminum alloy, having superior heat generating efficiency, and non-metal materials, such as silicon carbide, boron nitride and ruthenium oxide, may be adopted.

In the case of the application of the minute heat source system, it is possible to carry out a tracking operation by using virtually the same method as the normal magnetic recording process. In other words, the tracking operation is carried out by recording a tracking servo signal as a magnetic signal. In this case, a pattern (servo pattern) that is completely different from the user data signal is preliminarily recorded along the track intermittently, and this signal is read out through the magnetic head in the same manner as the user data. In the present invention, since the multi-head system is adopted, the servo pattern may be provided for each track, or a physically large-size servo pattern may be preliminarily recorded in a manner so as to bridge a plurality of tracks so that the servo signal is taken out based upon an operation (for example, a simple added signal) of reproduced signals from the respective magnetic heads.

In the same manner as the first embodiment, the application of the construction of the second embodiment makes it possible to obtain high track density and high linear recording density. Moreover, as compared with the first embodiment, since the distance between the information bits 11 on adjacent tracks is widened, magnetic interference exerted on the information bits 11 at the time of recording or reproducing is suppressed so that it is possible to record and reproduce information with a superior S/N ratio.

In the case when the magnetic recording and reproducing processes in accordance with the second embodiment are carried out, it is preferable to set the ratio of the bit length (length represented by a in FIG. 2) in parallel with (track direction) the information track 13 which faces the bottom face of the main magnetic pole of the single magnetic pole head 4 to the length between the tracks (length represented by b in FIG. 2) in a direction perpendicular to the track direction to not more than 1. For this reason, in order to widen the distance between the single magnetic pole heads 4 so as to effectively suppress the above-mentioned magnetic interference, it is preferable to set tan θ to not more than 1, that is, to set the angle θ to not more than 45 degrees.

As described above, the magnetic recording-reproduction apparatus of the present invention, which carries out recording and reproducing processes on and from a magnetic recording-reproducing medium on which a perpendicular magnetic recording layer made of a ferrimagnetic material whose magnetic compensation temperature is set to approximately room temperature is formed, is provided with: a recording-reproducing magnetic head constituted by not less than two single magnetic pole magnetic heads having respective main magnetic poles whose length directions are aligned in the same direction as the information track direction of the magnetic recording-reproducing medium; and a temperature-raising means for allowing an area facing the main magnetic poles of the respective single magnetic pole heads in the perpendicular magnetization layer to have a temperature rise.

With the above-mentioned arrangement, not less than two of the single magnetic pole magnetic heads which have respective main magnetic poles whose length directions are aligned in the same direction as the information track direction of the magnetic recording-reproducing medium, and a portion of an area of the perpendicular magnetic recording layer having the recording layer made from a ferrimagnetic material having a magnetic compensation temperature set to approximately room temperature, which faces the main magnetic pole of the single magnetic pole heads, is subjected to a temperature rise, for example, by irradiation with a light beam or heating by using a minute thermal source, and the recording and reproducing processes are carried out as follows:

When, upon recording, the temperature of a recording area is raised to the vicinity of the Curie temperature so that the coercive force of the perpendicular magnetic recording layer becomes virtually zero, the leakage magnetic field from the single magnetic pole heads is applied to the recording area so that the information is readily recorded thereon. In other words, a high track density is achieved by a recording process using the narrow track that virtually corresponds to the width of each main magnetic pole of the single magnetic pole heads.

In contrast, when, upon reproducing, the temperature of a reproducing area is raised so as to allow the saturated magnetization of the ferrimagnetic material to reach the vicinity of the maximum value, a non-temperature-rise area, that is, an area that faces the main magnetic poles of the single magnetic pole heads and is maintained in the vicinity of the magnetic compensation temperature; therefore, a magnetic flux released from the saturated magnetization only from the temperature-rise area is detected by the single magnetic pole heads facing the area with high precision. This makes it possible to positively solve the conventional problem that information separation is not properly made due to the operation carried out in a manner bridging over a plurality of recording bits in the track direction, and consequently to reproduce information recorded with high linear density that is an original feature of the perpendicular magnetic recording system.

Moreover, it is not necessary to install separated sets of single magnetic pole heads respectively used for recording and reproducing, and this eliminates the need for a special signal processing such as a multi-value processing that is required for a multi-track reproducing process in the case of a single reproducing head. Furthermore, in the case when an optical beam is used to raise the temperatures of the recording area and the reproducing area, a high-precision tracking operation is available by using the optical beam applied thereto.

Here, the gap between the single magnetic pole heads can be widened by orienting the alignment direction of the single magnetic pole heads with an angle with respect to the direction of the information tracks; thus, it is possible to reduce magnetic interferences from the adjacent single magnetic pole heads, and consequently to provide information recording and reproducing processes with a further improved S/N ratio.

Moreover, the application of an arrangement in which an elliptical area elongated in the aligning direction of the single magnetic pole heads is used as the temperature-rise area makes it possible to raise the temperature of areas of the perpendicular magnetic recording layer facing the single magnetic pole heads at one time, and consequently to simplify the temperature-raising means as well as to suppress the expansion of the temperature distribution of the temperature-rise area in the track direction. Thus, a bit recording process, which is virtually determined by the shape of the main magnetic pole of the single magnetic pole head, can be carried out with higher linear density.

Furthermore, it becomes possible to make the magnetic recording-reproduction apparatus thinner by arranging the recording-reproducing magnetic head and the temperature raising means on the same side as the perpendicular magnetic layer (see FIGS. 3–6).

Industrial Applicability

As described above, the magnetic recording-reproduction apparatus and the recording-reproduction method thereof in accordance with the present invention are preferably applied to the perpendicular magnetic recording system which achieves high-density recording in apparatuses such as magnetic disk apparatuses and magnetic tape apparatuses. In particular, with the arrangement in which the recording-reproducing magnetic head 5 and the light beam irradiation system 15 (or a minute heat generating body) are placed on the same side as the perpendicular magnetic recording layer, the apparatus is preferably used for magnetic recording-reproduction apparatuses that particularly require thinness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording-reproduction apparatus, which carries out recording and reproducing processes on and from an magnetic-reproducing medium on which a perpendicular magnetic recording layer made of a ferrimagnetic magnetic material whose magnetic compensation temperature is set to approximately room temperature is formed, characterized by comprising:

a recording-reproducing magnetic head constituted by a plurality of single magnetic pole magnetic heads having respective main magnetic poles whose length directions are aligned in the same direction as the information track direction of the magnetic recording-reproducing medium, the recording-reproducing magnetic head carrying out both recording and reproducing on and from respective different tracks; and temperature-raising means for allowing an area facing the main magnetic poles of the respective single magnetic pole heads in the perpendicular magnetization layer to have a temperature rise.

2. The magnetic recording-reproduction apparatus according to claim 1, characterized in that in the recording-reproducing magnetic head, the single magnetic pole heads are arranged in a direction perpendicular to the information track direction with predetermined intervals with the respective single magnetic pole heads being aligned to face the information tracks.

3. The magnetic recording-reproduction apparatus according to claim 1, characterized in that in the recording-reproducing magnetic head, the single magnetic pole heads are arranged in a direction with a predetermined angle with respect to the information track direction with the respective single magnetic pole heads being aligned to face the information tracks.

4. The magnetic recording-reproduction apparatus according to claim 1, characterized in that, upon recording, the temperature raising means raises the temperature of a recording area to a temperature in the vicinity of the Curie temperature of the perpendicular magnetic recording layer, while, upon reproducing, the temperature raising means raises the temperature of a reproducing area to a temperature that allows the saturated magnetization of the perpendicular magnetic recording layer to reach the vicinity of a maximum value.

5. The magnetic recording-reproduction apparatus according to claim 4, characterized in that the temperature raising means raises the temperature of the recording area or the reproducing area by applying a light beam thereto.

6. The magnetic recording-reproduction apparatus according to claim 5, characterized in that the temperature raising means comprises a light source for releasing the light beam and an optical system for forming the light beam into a predetermined shape and for converging the resulting light beam onto the recording area or the reproducing area.

7. The magnetic recording-reproduction apparatus according to claim 6, characterized in that the optical system comprises a cylindrical lens for forming the light beam into an elliptical shape and an objective lens for converging light released from the cylindrical lens onto the recording area or the reproducing area.

8. The magnetic recording-reproduction apparatus according to claim 6, characterized in that the optical system comprises a triangular prism for forming the light beam into an elliptical shape and for directing the resulting light beam to the recording area or the reproducing area.

9. The magnetic recording-reproduction apparatus according to claim 6, characterized in that the optical system comprises a taper-shaped waveguide for changing the shape of the light beam.

10. The magnetic recording-reproduction apparatus according to claim 4, characterized in that the temperature raising means is a minute heat source system made of a minute heat generating body for generating heat so as to raise the temperature of the recording area or the reproducing area.

11. The magnetic recording-reproduction apparatus according to claim 1, characterized in that the recording-reproducing magnetic head and the temperature raising means are placed on the same side of the perpendicular magnetic recording layer.

12. The magnetic recording-reproduction apparatus according to claim 1, characterized in that the recording-reproducing magnetic head and the temperature raising means are placed on the opposite sides of the perpendicular magnetic recording layer.

13. The magnetic recording-reproduction apparatus according to claim 1, characterized in that the temperature raising means is placed close to one portion of the area facing the main magnetic poles of the respective single magnetic pole heads in the magnetic recording-reproducing medium.

14. The magnetic recording-reproduction apparatus according to claim 10, characterized in that the minute heat source system extends long in an alignment direction of the single magnetic pole heads.

15. A magnetic recording-reproduction method, which carries out recording and reproducing processes on and from a magnetic recording medium on which a perpendicular magnetic recording layer made of a ferrimagmetic material whose magnetic compensation temperature is set to approximately room temperature is formed, by using a recording-reproducing magnetic head constituted by a plurality of single pole magnetic heads having respective main magnetic poles whose length directions are aligned in the same direction as the information track direction of the magnetic recording-reproducing medium, the recording-reproducing magnetic head carrying out both recording and reproducing on and from respective different tracks, characterized by comprising the steps of:

upon recording, recording information through the recording-reproducing magnetic head by raising the temperature of the recording area to the vicinity of the Curie temperature of the perpendicular magnetic recording layer; and upon reproducing, reading information from the reproducing area through the recording-reproducing head by raising the temperature of a reproducing area to a temperature that allows the saturated magnetization of the perpendicular magnetic recording layer to reach the vicinity of a maximum value.

16. The magnetic recording-reproduction method according to claim 15, characterized in that in the recording and reproducing processes, information is recorded and reproduced respectively while a recording area and a reproducing area, which are placed in a direction perpendicular to the information track direction, are allowed to have a temperature rise.

17. The magnetic recording-reproduction method according to claim 15, characterized in that in the recording and reproducing processes, information is recorded and reproduced respectively while a recording area and a reproducing area on the information track, which are placed in a direction with a predetermined angle with respect to the information track direction, are allowed to have a temperature rise.

18. The magnetic recording-reproduction method according to claim 15, characterized in that in the recording and reproducing processes, the recording area and the reproducing area are respectively subjected to a temperature rise by applying a light beam thereon.

19. The magnetic recording-reproduction method according to claim 18, characterized in that in the recording and reproducing processes, the recording area or the reproducing area is subjected to a temperature rise by forming the light beam into an elliptical shape and converging the resulting light beam thereon.

20. The magnetic recording-reproduction method according to claim 18, characterized in that the recording area and the reproducing area are subjected to temperature rises by applying a light beam from the side where the recording-reproducing magnetic head is installed.

21. The magnetic recording-reproduction method according to claim 15, characterized in that in the recording and reproducing processes, the recording area or the reproducing area is subjected to a temperature rise by applying heat from a minute heat source system made of a minute heat generating body.

22. The magnetic recording-reproduction apparatus according to claim 3, characterized in that each of the single magnetic pole heads is installed in a direction with an angle not more than 45 degrees with respect to the information track direction.

23. A magnetic recording-reproduction apparatus, which carries out recording and reproducing processes on and from an magnetic-reproducing medium on which a perpendicular magnetic recording layer made of a ferrimagnetic magnetic material whose magnetic compensation temperature is set to approximately room temperature is formed, characterized by comprising:

a recording-reproducing magnetic head constituted by a plurality of single magnetic pole magnetic heads having respective main magnetic poles whose length directions are aligned in the same direction as the information track direction of the magnetic recording-reproducing medium, the recording-reproducing magnetic head carrying out both recording and reproducing on and from respective different tracks; and temperature-raising means for allowing one portion of an area facing the main magnetic poles of the respective single magnetic pole heads in the perpendicular magnetization layer to have a temperature rise.

* * * * *

UNITED STATES PATENT AND TRADEMARK OFFICE
CERTIFICATE OF CORRECTION

PATENT NO. : 6,327,227 B1
DATED : December 4, 2001
INVENTOR(S) : H. Katayama

It is certified that error appears in the above-identified patent and that said Letters Patent is hereby corrected as shown below:

<u>Title page,</u>
Delete "[22] PCT Filed: Jul. 24, 1998" and substitute therefor:
-- [22] PCT Filed: July 27, 1998 --.

Signed and Sealed this

Twenty-first Day of May, 2002

*Attest:*

*Attesting Officer*

JAMES E. ROGAN
*Director of the United States Patent and Trademark Office*